US011869468B2

(12) United States Patent
Lerman et al.

(10) Patent No.: US 11,869,468 B2
(45) Date of Patent: Jan. 9, 2024

(54) MUSICAL COMPOSITION FILE GENERATION AND MANAGEMENT SYSTEM

(71) Applicant: Wonder Inventions, LLC, New York, NY (US)

(72) Inventors: Howard Christopher Lerman, Miami Beach, FL (US); Thomas Christopher Dixon, Miami Beach, FL (US); Sean Joseph MacIsaac, New York, NY (US); Yunus Saatci, San Francisco, CA (US); Klas Aaron Pascal Leino, Pittsburgh, PA (US); Peter Gregory Lerman, Delray Beach, FL (US)

(73) Assignee: ROAM HQ, INC., New York, NY (US)

( * ) Notice: Subject to any disclaimer, the term of this patent is extended or adjusted under 35 U.S.C. 154(b) by 0 days.

(21) Appl. No.: 17/506,176

(22) Filed: Oct. 20, 2021

(65) Prior Publication Data

US 2022/0262328 A1 Aug. 18, 2022

Related U.S. Application Data

(63) Continuation of application No. 17/176,869, filed on Feb. 16, 2021, now Pat. No. 11,183,160.

(51) Int. Cl.
*G10H 1/00* (2006.01)
*G10H 1/06* (2006.01)

(52) U.S. Cl.
CPC ......... *G10H 1/0025* (2013.01); *G10H 1/0066* (2013.01); *G10H 1/06* (2013.01)

(58) Field of Classification Search
CPC ........... G10H 1/0025; G10H 2240/131; G10H 1/368; G10H 2210/111; G10H 2210/105; G10H 2210/145; G10H 2220/011; G10H 2210/101; G10H 1/36
See application file for complete search history.

(56) References Cited

U.S. PATENT DOCUMENTS

| | | | |
|---|---|---|---|
| 5,315,057 | A | 5/1994 | Land et al. |
| 7,333,934 | B1 | 2/2008 | Carson |
| 8,525,012 | B1 | 9/2013 | Yang |

(Continued)

FOREIGN PATENT DOCUMENTS

| | | | | |
|---|---|---|---|---|
| EP | 1326228 A1 * | 7/2003 | ............. | G05B 15/02 |
| WO | WO-2006022606 A2 * | 3/2006 | ............. | G06F 3/165 |

OTHER PUBLICATIONS

PCT Notification of Transmittal of The International Search Report and The Written Opinion of the International Searching Authority for PCT Application No. PCT/US2022/012987, dated Feb. 4, 2022, 7 pages.

*Primary Examiner* — Marlon T Fletcher
(74) *Attorney, Agent, or Firm* — Lowenstein Sandler LLP

(57) ABSTRACT

A system and method to identify a digital representation of a first musical composition including a set of musical blocks. A set of parameters associated with video content are identified. In accordance with one or more rules, one or more of the set of musical blocks of the first musical composition are modified based on the set of parameters to generate a derivative musical composition corresponding to the video content. An audio file including the derivative musical composition corresponding to the video content is generated.

20 Claims, 8 Drawing Sheets

(56) References Cited

U.S. PATENT DOCUMENTS

| | | | | |
|---|---|---|---|---|
| 11,183,160 | B1 * | 11/2021 | Lerman | G10H 1/06 |
| 2001/0035087 | A1 | 11/2001 | Subotnick | |
| 2003/0128825 | A1 * | 7/2003 | Loudermilk | H04M 3/4285<br>379/102.01 |
| 2003/0159567 | A1 | 8/2003 | Subotnick | |
| 2005/0235812 | A1 | 10/2005 | Fallgatter | |
| 2007/0157275 | A1 | 7/2007 | Marcus | |
| 2007/0198363 | A1 | 8/2007 | Quoc et al. | |
| 2008/0011149 | A1 * | 1/2008 | Eastwood | G10H 1/368<br>84/611 |
| 2008/0016114 | A1 | 1/2008 | Beauregard et al. | |
| 2008/0041220 | A1 | 2/2008 | Foust et al. | |
| 2008/0141850 | A1 | 6/2008 | Cope | |
| 2008/0156178 | A1 * | 7/2008 | Georges | G10H 1/365<br>84/645 |
| 2008/0190268 | A1 | 8/2008 | McNally | |
| 2008/0314232 | A1 | 12/2008 | Hansson et al. | |
| 2015/0256613 | A1 | 9/2015 | Walker et al. | |
| 2018/0181730 | A1 | 6/2018 | Lyske | |
| 2019/0237051 | A1 | 8/2019 | Silverstein | |
| 2019/0258448 | A1 | 8/2019 | Mollis et al. | |
| 2019/0362696 | A1 * | 11/2019 | Balassanian | G06F 16/68 |
| 2019/0392852 | A1 | 12/2019 | Hijazi et al. | |
| 2020/0058279 | A1 | 2/2020 | Garrison | |
| 2021/0027754 | A1 * | 1/2021 | Balassanian | G10H 1/0025 |
| 2021/0248983 | A1 * | 8/2021 | Balassanian | G06F 21/16 |
| 2022/0059063 | A1 * | 2/2022 | Balassanian | G06N 20/00 |
| 2022/0208155 | A1 * | 6/2022 | Ivers | G10H 1/368 |
| 2022/0262328 | A1 * | 8/2022 | Lerman | G10H 1/06 |

* cited by examiner

MUSICAL COMPOSITION FILE GENERATION AND MANAGEMENT SYSTEM

CROSS-REFERENCE TO RELATED APPLICATION

This is a continuation application of U.S. patent application Ser. No. 17/176,869, filed Feb. 16, 2021, titled "Musical Composition File Generation and Management System", the entirety of which is hereby incorporated by reference herein.

TECHNICAL FIELD

Embodiments of the disclosure are generally related to content generation and management, and more specifically, are related to a platform to generate an audio file including a musical composition configured in accordance with parameters relating to associated source content.

BACKGROUND

We live in a world where music is produced with no regard to timing and duration constraints. But most source content, be it a live event, a gym class or video file consist of events that occur at strict timing intervals. The essence of this invention is to build a system that can generate great music that respects such timing requirements. For example, a media file may include a video component including multiple video segments (e.g., scenes marked by respective scene or segment transitions) which, in turn, include video images arranged with a corresponding audio track. The audio track can include a voice component (e.g., dialogue, sound effects, etc.) and an associated musical composition. The musical composition can include a structure defining an instrumental arrangement configured to produce a musical piece that corresponds to and respects the timings of the associated video content. This instance of making music to fit the duration and scenes of a video is so frequently encountered that we will be using it as the main application in the following discourse, nonetheless, the system can, and will be used for other source content.

Media creators typically face many challenges in creating media content including both a video component and a corresponding audio component (e.g., the musical composition). To optimize primary creative principles, media creators require a musical composition that satisfies various criteria including, for example: 1) a musical composition having an overall duration that matches a duration of source content (e.g., a video), 2) a musical composition having musical transitions that match the timing of the scene or segment transitions, 3) a musical composition having an overall style or mood (e.g., musicality) that matches the respective segments of the source content, 4) a musical composition configured in an electronic file having a high-quality reproducible format, 5) a musical composition having related intellectual property rights to enable the legal reproduction of the musical composition in connection with the use of the media file, etc.

Media creators can employ a custom composition approach involving the custom creation of a musical composition in accordance with the above criteria. In this approach, a team of composers, musicians, and engineers are required to create a specifically tailored musical composition that matches the associated video component. The custom composition requires multiple phases of execution and coordination including composing music to match the source content, scoring the music to enable individual musicians to play respective parts, holding recording sessions involving multiple musicians playing different instruments, mixing individual instrument tracks to create a single audio file, and mastering the resulting audio file to produce a final professional and polished sound.

However, this approach is both expensive and time-consuming due to the involvement and coordination of many skilled people required to perform the multiple phases of the production process. Furthermore, if the underlying source content undergoes any changes following production of a customized musical composition, the making of corresponding changes to the music composition (e.g., changes to the timing, mood, duration, etc. of the music) requires considerable effort to achieve musical coherence. Specifically, modifications to the music composition requires the production stages to be repeated, including re-scoring, re-recording, re-mixing, and re-mastering the music. In addition, in certain instances a media creator may change the criteria used to generate the musical composition during any stage of the process, requiring the custom composition process to be at least partially re-executed.

Due to the costs and limitations associated with the custom composition approach, some media creators employ a different approach based on the use of stock music. Stock music is composed and recorded in advance and made available for use in videos. For example, samples of stock music that are available in libraries can be selected, licensed and used by media creators. In this approach, a media creator may browse stock music samples in these libraries to select a piece of stock music that fits the overall style or mood of the source content. This is followed by a licensing and payment process, where the media creator obtains an audio file corresponding to the selected stock music.

However, since the stock music is recorded in advance and independently of the corresponding source content (e.g., a video component of the source content), it is significantly challenging to appropriately match the various characteristics (e.g., duration, transitions, etc.) of the source content to the stock music. For example, the musical transitions in the stock music do not match the scene transitions in the corresponding video.

In view of the above, the media creator may be forced to perform significant work-around techniques including selecting music before creating the source content, then designing the source content to match the music, chopping up and rearranging the audio file to match the source content, adding extraneous sound effects to the audio to overcome discontinuities with the source content, etc. These work-around techniques are time-consuming and inefficient, resulting in a final media file having source content (e.g., video) and music that are not optimally synchronized or coordinated. Furthermore, the stock music approach is inflexible and unable to adjust to changes to the corresponding source content, frequently requiring the media creator to select an entirely different stock music piece in response to changes or adjustments to the characteristics of the source content.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
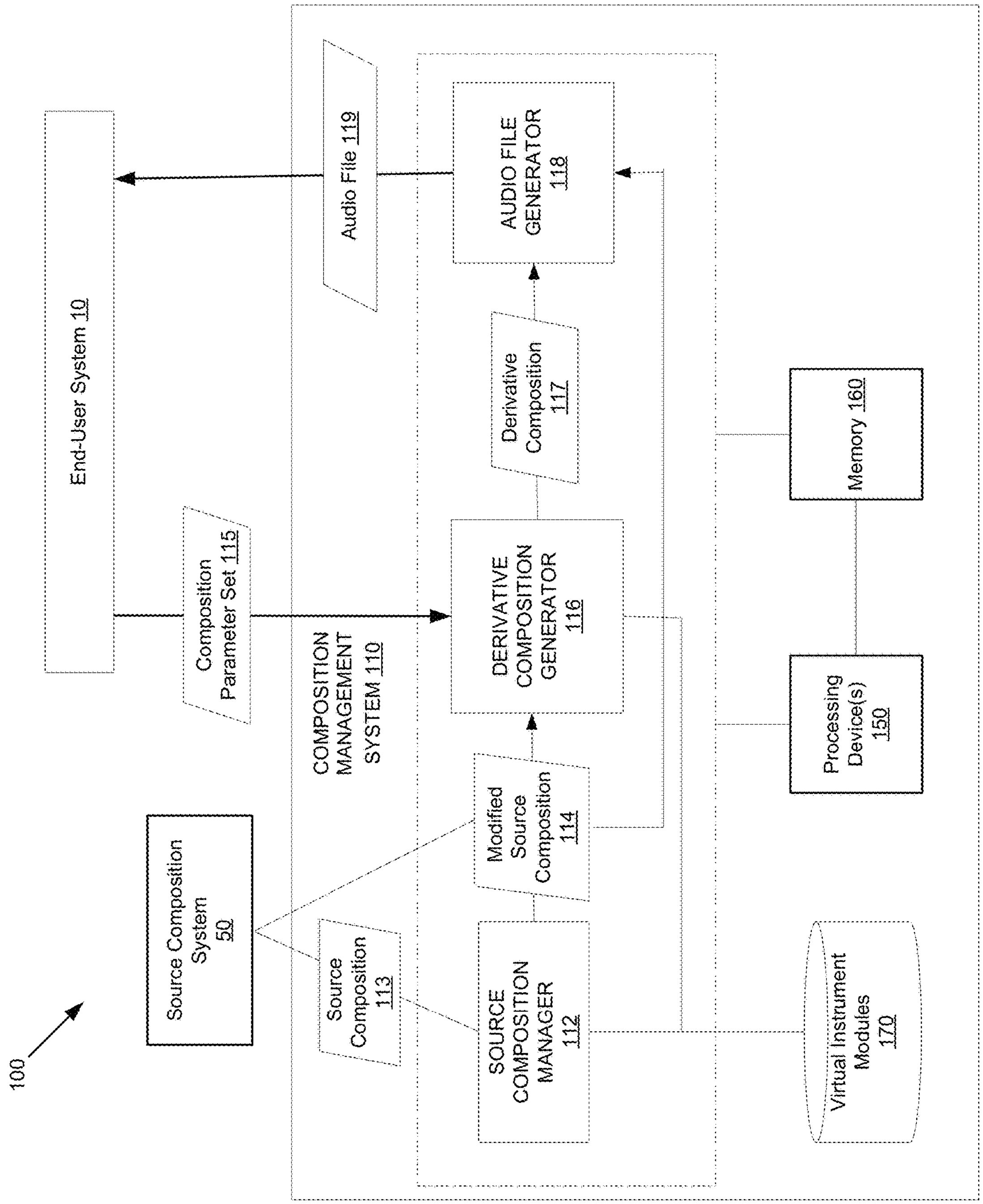
FIG. 1 illustrates an example of a computing environment including a composition management system, in accordance with one or more embodiments of the present disclosure.

Aspects of the present disclosure relate to a method and system to generate an audio file including a musical composition corresponding to a video component of an electronic media file. According to embodiments, a system (e.g., a "composition management system") is provided to execute one or more methods to manage an initial music composition to generate a customized or derivative music composition in accordance with a set of composition parameters associated with a corresponding video component, as described in detail herein. Embodiments of the present disclosure address the above-mentioned problems and other deficiencies with current musical scoring technologies and approaches by generating an audio file including a musical composition customized or configured to match or satisfy one or more parameters associated with source content (e.g., a video content file, a live streaming event, etc.). Furthermore, embodiments of the present disclosure enable the dynamic generation of musical compositions in response to updates, modifications or changes made to the associated source content.

In an embodiment, the composition management system identifies a source music composition (e.g., an original composition or available existing composition such as a musical work in the public domain) having a source or first musical score. In an embodiment, the source musical score includes a set of instructions (e.g., arrangement of notes and annotations) for performance of a music piece having a set of one or more instrument tracks corresponding to respective instrument scores and score elements (e.g., a unit or portion of the music instructions). For example, the first musical score can include a digital representation of Eine Kleine Nachtmusik by Wolfgang Amadeus Mozart including a set of instructions associated with musical events as generated, arranged and intended by the original composer.

In an embodiment, the composition management system transforms or restructures the source musical score to generate a modified source musical score having a set of musical blocks. As described below, in another embodiment, the modified source musical score (e.g., the musical score including the musical blocks) can be received from a source composition system. A musical block is a portion or unit of the score that can be individually modified or adjusted according to a modification action (e.g., repeating a musical block, expanding a musical block, shortening a musical block, etc.). In an embodiment, each musical block is marked by a beginning or ending boundary, also referred to as a "transition". In an embodiment, the modified source musical score can be split into multiple tracks, where each track corresponds to a portion of the score played by a particular instrument.

In an embodiment, the composition management system can receive a modified source musical score (e.g., a source musical score modified as described above) directly from a source composition system. In this embodiment, the modified source musical score as received from the source composition system (e.g., a system operated by a musician, composer, music engineers, etc.) includes a set of musical blocks. In this embodiment, the source composition system can interact with an interface of the composition management system to input the modified source musical score into the composition management system for further processing, as described in detail below.

In an embodiment, each track of the modified source musical score can be assigned a specific virtual instrument module (e.g., a virtual piano, a virtual drum, a virtual violin, etc.) corresponding to the track. In an embodiment, the virtual instrument module includes a set of software instructions (e.g., a plug-in) configured as a sound module to generate an audio output (e.g., one or more samples of an audio waveform) that emulates a particular instrument in accordance with the score elements of a corresponding instrument track.

In an embodiment, the composition management system can identify and add one or more transition elements to the modified source musical score. A transition element can include one or more music or score elements (e.g., a musical note or sequence of notes) that are added to the score notation and are to be played when transitioning between musical blocks. In an embodiment, the transition elements can be added to the modified source musical score as separate tracks.

In an embodiment, the composition management system generates and stores a collection of modified musical sources having respective sets of musical blocks and transition elements. In an embodiment, the composition management system provides an interface to an end user system associated with a user (e.g., a video or media creator) to enable the generation of an audio file including a musical score that satisfies a set of parameters associated with a source video (also referred to as a "composition parameter set"). In an embodiment, the composition parameter set may include one or more rules, parameters, requirements, settings, guidelines, etc. that a musical composition is to satisfy for use in connection with source content (e.g., a video, a live stream, any media that is capable of having a musical composition accompaniment, etc.). In an embodiment, the composition parameter set is a customized or tailored set of requirements (e.g., parameters and parameter values) that are associated with the source content. In an embodiment, the composition parameter set and associated data can be received from the end user system in connection with the source content. For example, the composition management system may receive a composition parameter set including target or desired values for parameters of a target musical score including, but not limited to, a duration of the musical score, a time location of one or more transition markers, a false ending marker location (e.g., a section that precedes an end portion of a musical score that does not represent the true or actual end), a time location of one or more pauses in the source content, a time location of one or more emphasis markers, and a time location associated with an ending of the source content.

In an embodiment, the composition management system identifies a modified source composition to be processed in accordance with the composition parameter set. In an embodiment, the modified source composition for use with a particular source video is identified in response to input (e.g., a selection) from the end user system. In an embodiment, the composition management system uses the modified source composition with the composition parameter set and generates a derivative composition. In an embodiment, the derivative composition includes a version of the modified source composition that is configured or customized in accordance with the composition parameter set. In an embodiment, the derivative composition generated by the composition management system includes the underlying musical materials of the modified source composition conformed to satisfy the composition parameter set associated with the source content, while not sacrificing musicality. In an embodiment, the composition management system is configured to execute one or more rules-based processes or artificial intelligence (AI) algorithms to generate the derivative composition, as described in greater detail below.

In an embodiment, the end user system can provide an updated or modified composition parameter set in view of changes, updates, modifications or adjustments to the source content. Advantageously, the updated composition parameter set can be used by the composition management system to generate a new or updated derivative composition that is customized or configured for the new or updated source content. Accordingly, the composition management system can dynamically generate an updated or new derivative composition based on updates, changes, or modifications to the corresponding and underlying source content. This provides end-user systems with greater flexibility and improved efficiencies in the computation and generation of an audio file for use in connection with source content that has been changed or modified.

In an embodiment, the derivative composition is generated as a music instrument digital interface (MIDI) file including a set of one or more MIDI events (e.g., an element of data provided to a MIDI device to prompt the device to perform an action at an associated time). In an embodiment, a MIDI file is formatted to include musical events and control messages that affect and control behavior of a virtual instrument.

In an embodiment, the composition management system generates or renders an audio file based on the derivative composition. In an embodiment, the audio file rendering or generation process includes mapping from the MIDI data of the derivative composition to audio data. In an embodiment, the composition management system includes a plug-in host application (e.g., an audio plug-in software interface that integrates software synthesizers and effects units into digital audio workstations) configured to translate the MIDI-based derivative composition into the audio output using a function (e.g., a block of code that executes when called) and function call (e.g., a single function call) in a suitable programming language (e.g., the Python programming language) to enable distributed computation to generate the audio file. In an embodiment, the composition management system provides the resulting audio file to the end-user system for use in connection with the source content.

FIG. 1 illustrates an example computing environment 100 including a composition management system 110 configured for communicative coupling with one or more end-user systems (e.g., end-user system 10 shown in FIG. 1). In an embodiment, the end-user system 10 is associated with a user (e.g., a media creator) that interfaces with the composition management system 110 to enable the generation of an audio file including a musical composition that is customized or configured in accordance with source content. According to embodiments, the source content can include any form or format of media, including, but not limited, to a pre-existing video, a live event (e.g., a live fitness class), etc. For example, the source content can include a video (e.g. a video file), a plan associated with a live event, a presentation, a collection of images, etc.

In an embodiment, the end-user system 10 can include any suitable computing device (e.g., a server, a desktop computer, a laptop computer, a mobile device, etc.) configured to operatively couple and communicate with the composition management system 100 via a suitable network (not shown), such as a wide area network, wireless local area network, a local area network, the Internet, etc. As used herein, the term "end-user" or "user" refers to one or more users operating an electronic device (e.g., end-user system 10) to request the generation of an audio file by the composition management system 110.

In an embodiment, the end-user system 10 is configured to execute an application to enable execution of the features of the composition management system 110, as described in detail below. For example, the end-user system 10 can store and execute a program or application associated with the composition management system 110 or access the composition management system 110 via a suitable interface (e.g., a web-based interface). In an embodiment, the end-user system 10 can include a plug-in software component to a content generation program (e.g., a plug-in to Adobe Premiere Pro® configured to generate video content) that is configured to interface with the composition management system 110 during the creation of source content to produce related musical compositions, as described in detail herein.

According to embodiments, the composition management system 110 can include one or more software and/or hardware modules to perform the operations, functions, and features described herein in detail. In an embodiment, the composition management system 110 can include a source composition manager 112, a derivative composition generator 116, an audio file generator 118, one or more processing devices 150, and one or more memory devices 160. In one embodiment, the components or modules of the composition management system 110 may be executed on one or more computer platforms interconnected by one or more networks, which may include a wide area network, wireless local area network, a local area network, the Internet, etc. The components or modules of the composition management system 110 may be, for example, a software component, hardware component, circuitry, dedicated logic, programmable logic, microcode, etc., or combination thereof configured to implement instructions stored in the memory 160. The composition management system 110 can include the memory 160 to store instructions executable by the one or more processing devices 150 to perform the instructions to execute the operations, features, and functionality described in detail herein.

In an embodiment, as shown in FIG. 1, a modified source composition 114 can be received from a source composition system 50 (e.g., a system operated by a user such as a music engineer, composer, musician, etc.). In this embodiment, a digital representation of the modified source composition 114 including the corresponding set of musical blocks is received from a source composition system 50. The modified source composition 114 is received as an input and provided to the derivative composition generator 116 for further processing, as described below.

In an embodiment, the source composition manager 112 can provide an interface to enable a source composition system 50 to take or compose a source composition 113 (e.g., in a digitized or non-digitized format) and generate a digital representation of a modified source composition 114 based on a source composition 113. In this example, the source composition manager 112 can include an interface and tools to enable the source composition system to generate the modified source composition 114 based on the source composition 114.

In an embodiment, the source musical score includes a set of instructions (e.g., arrangement of notes and annotations) for performance of a music piece having a set of one or more instrument tracks corresponding to respective instrument scores and score elements (e.g., a unit or portion of the music instructions). In an embodiment, the one or more source compositions can be an original composition or available existing composition (e.g., a composition available in the public domain). In an embodiment, the source composition 113 includes a set of instructions (e.g., arrangement of notes and annotations) for performance of a musical score having a set of one or more instrument tracks corresponding to respective instrument scores and score elements (e.g., a unit or portion of the music instructions).

Figure 2:
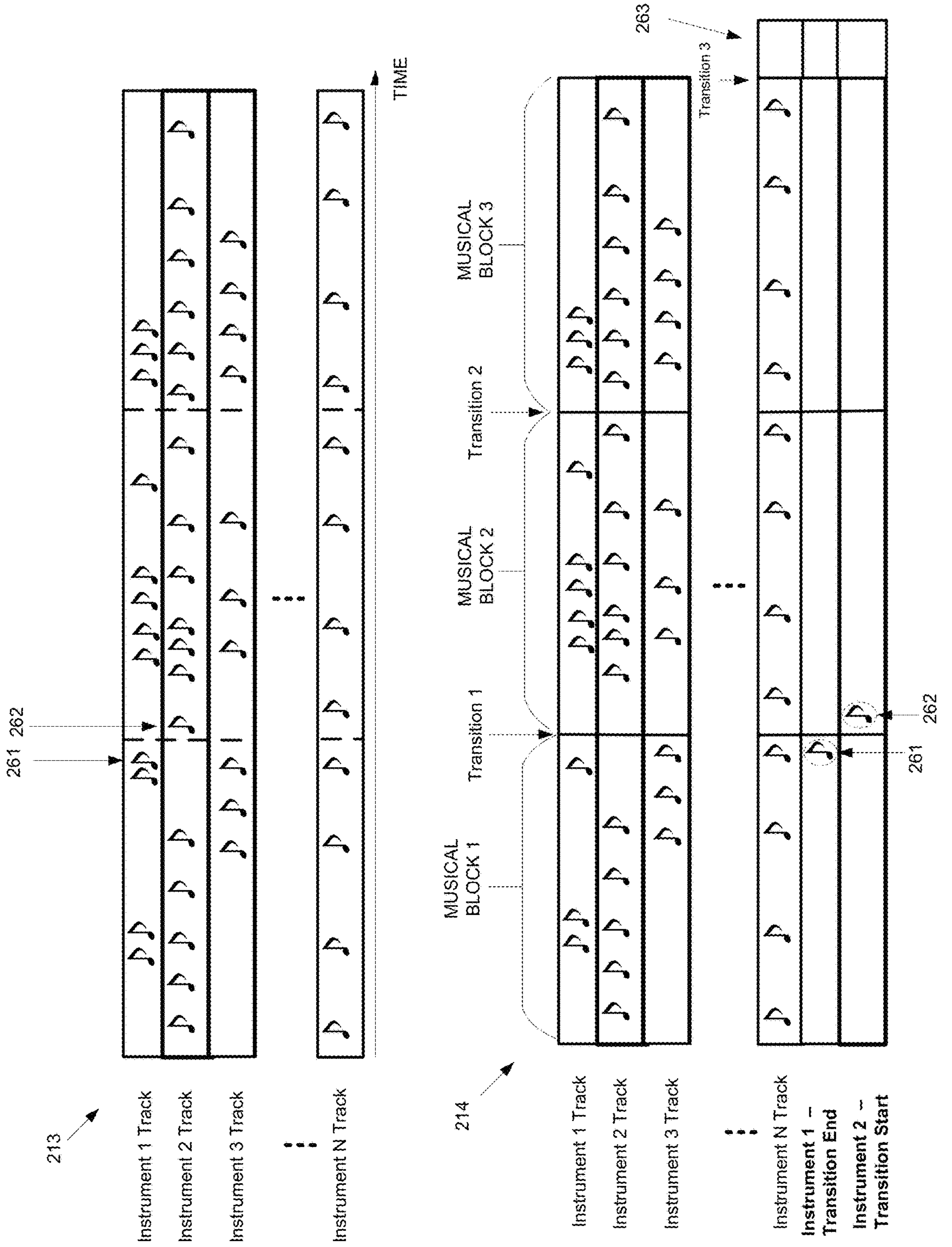
FIG. 2 illustrates example source composition and modified source compositions associated with a composition management system, in accordance with one or more embodiments of the present disclosure.

In an embodiment, the source composition manager 112 provides an interface and tools for use by a source composition system 50 to generate a modified source composition 114 having a set of musical blocks and a corresponding set of transitions associated with transition information. FIG. 2 illustrates an example source composition 213 that can be updated or modified via an interface of the source composition manager 112 of FIG. 1 to generate a modified source composition 214. As shown in FIG. 2, the source composition 213 includes a musical score (e.g., a set of instructions including a sequence of musical elements (e.g., 261, 262) to be performed by a set of instruments (e.g., Instrument 1, Instrument 2, Instrument 3 . . . Instrument N) along a time scale. In an embodiment, the source composition manager 112 of FIG. 1 splits the source composition 213 into multiple tracks (e.g., Instrument 1 Track, Instrument 2 Track, Instrument 3 Track . . . Instrument N Track), where each instrument track corresponds to a portion of the score played by a particular instrument (e.g., a piano, violin, guitar, drum, etc.).

As shown in FIG. 2, the modified source composition 214 includes a set of musical blocks (e.g., Musical Block 1, Musical Block 2, and Musical Block 3) based on interactions and inputs from the source composition system 50. In an embodiment, a musical block is a portion or unit of the score that can be individually modified or adjusted according to a modification action (e.g., repeating a musical block, expanding a musical block, shortening a musical block, etc.). In an embodiment, each musical block is marked by a beginning and/or ending transition, such as transition 1, transition 2, and transition 3 shown in FIG. 2. In an embodiment, the modified source musical score can be split into multiple tracks, where each track corresponds to a portion of the score played by a particular instrument. As described above, the modified source composition 214 can be received by the derivative composition generator 116 from the source composition system 50, as shown in FIG. 1.

In an embodiment, the composition management system 110 (e.g., the derivative composition generator 116) can assign each track a virtual instrument module or program configured to generate an audio output corresponding to the instrument type and track information. For example, the composition management system 110 can assign the Instrument 1 Track to a virtual instrument program configured to generate an audio output associated with a violin. In an embodiment, the virtual instrument module includes a set of software instructions (e.g., a plug-in) configured as a sound module to generate an audio output (e.g., one or more samples of an audio waveform) that emulates a particular instrument in accordance with the score elements of a corresponding instrument track. In an embodiment, the virtual instrument module includes an audio plug-in software interface that integrates software synthesizers to synthesize musical elements into an audio output. In an embodiment, as shown in FIG. 1, the composition management system 110 can include a data store including one or more virtual instrument modules 170. It is noted that the virtual instrument modules 170 can be maintained in a library that is associated with and updated by a third party system configured to provide software-based implementations of an instrument for use by the composition management system 110.

In an embodiment, the modified source composition 114 includes a sequence of one or more MIDI events (e.g., an element of data provided to a MIDI device to prompt the device to perform an action at an associated time) for processing by a virtual instrument module (e.g., a MIDI device) associated with a corresponding instrument type. In an embodiment, a MIDI file is formatted to include a set of hardware requirements and a protocol that electronic devices use to communicate and store data (i.e., it is a language, file format, and hardware specifications) to enable storing and transferring digital representations of music. In an embodiment, the musical blocks are configured in accordance with one or more rules or parameters that enable further processing by a rule-based system or machine-learning system to execute modifications or changes (e.g., musical block shortening, expansion, etc.) in response to parameters associated with source content, as described in greater detail below.

In an embodiment, the modified source composition 114 can include one or more musical elements corresponding to a transition of adjacent musical blocks, herein referred to as "transition musical elements". In an embodiment, the modified source composition 114 includes one or more tracks (e.g., Instrument 1-Transition End and Instrument 2-Transition Start of FIG. 2) including the transition musical elements (e.g., 261, 262). In an embodiment, the transition musical elements are identified to be played only when transitioning between musical blocks.

In the example shown in FIG. 2, the music element 261 played by Instrument 1 at the end of Musical Block 1 is moved to a separate track labeled Instrument 1-Transition End. In an embodiment, this indicates that if the Musical Block 1 portion is repeated in sequence, the extracted Instrument 1 note or notes are played only on a last repeat of the Musical Block 1 portion. In the example shown in FIG. 2, the music element 262 played by Instrument 2 at the beginning of Musical Block 2 is moved to a separate track labeled Instrument 2-Transition Start. In an embodiment, the extraction and creation of the Instrument 2-Transition Start track indicates that if the Musical Block 2 portion is repeated in sequence, the extracted Instrument 2 note or notes are played only on a first repeat of the Musical Block 2 portion.

In an embodiment, the modified source composition 214 including a sequence 263 (also referred to as an "end portion" or "end effects portion" that is arranged between a last musical element (e.g., a last note) the end of a music modified source composition 214. In an embodiment, the end portion is generated and identified for playback only at the end of the modified source composition 214.

As shown in FIG. 1 the modified source composition 114 is provided to the derivative composition generator 116. In an embodiment, the derivative composition generator 116 is configured to receive a composition parameter set 115 from the end-user system 10 and a modified source composition 114 as inputs and generates a derivative composition 117 as an output. In an embodiment, the composition parameter set 115 includes one or more requirements, rules, parameters, characteristics, descriptors, event markers, or other information relating to source content (e.g., audio content, video content, content including both audio and video, a live event stream, a live event plan, etc.) for which an associated audio file is desired. For example, the composition parameter set 115 can include one or more parameters relating to a planned live event, such as a marker corresponding to a transition in the live event plan. For example, the composition parameter set 115 can identify one or more cues or events (e.g., dimming the house lights, lighting up the stage, etc.) associated with respective transitions desired for the musical composition to be generated by the composition management system 110. For example, the composition parameter set 115 associated with a live event plan can information identifying one or more transition markers that are used to generate the musical composition, as described in detail herein.

In an embodiment, the composition parameter set 115 can be dynamically and iteratively updated, generated, or changed and provided as an input to the derivative composition generator 116. In an embodiment, new or updated parameters can be provided (e.g., by the end-user system 10) for evaluation and processing by the derivative composition generator 116. For example, a first composition parameter set 115 including parameters A and B associated with source content can be received at a first time and a second composition parameter set 115 including parameters C, D, and E associated with the same source content can be received at a second time, and so on.

In an embodiment, the derivative composition generator 116 applies one or more processes (e.g., one or more AI processing approaches) to the modified source composition 114 to generate or derive a derivative composition 117 that meets or satisfies the one or more requirements of the composition parameter set 115. Example composition parameters or requirements associated with the source content include, but are not limited to, a duration (e.g., a time span in seconds) of the source content, time locations associated with transition markers associated with transitions in the source content (e.g., one or more times in seconds measured from a start of the source content), a false ending marker (e.g., a time in seconds measured from a start of the source content) associated with a false ending of the source content, one or more pause markers (e.g., one or more times in seconds measured from a start of the source content and a length of the pause duration) identifying a pause in the source content), one or more emphasis markers (e.g., one or more times in seconds measured from a start of the source content) associated with a point of emphasis within the source content, and an ending location marker (e.g., a time in seconds measured from a start of the source content) marking an end of the video images of the source content.

Figure 3:
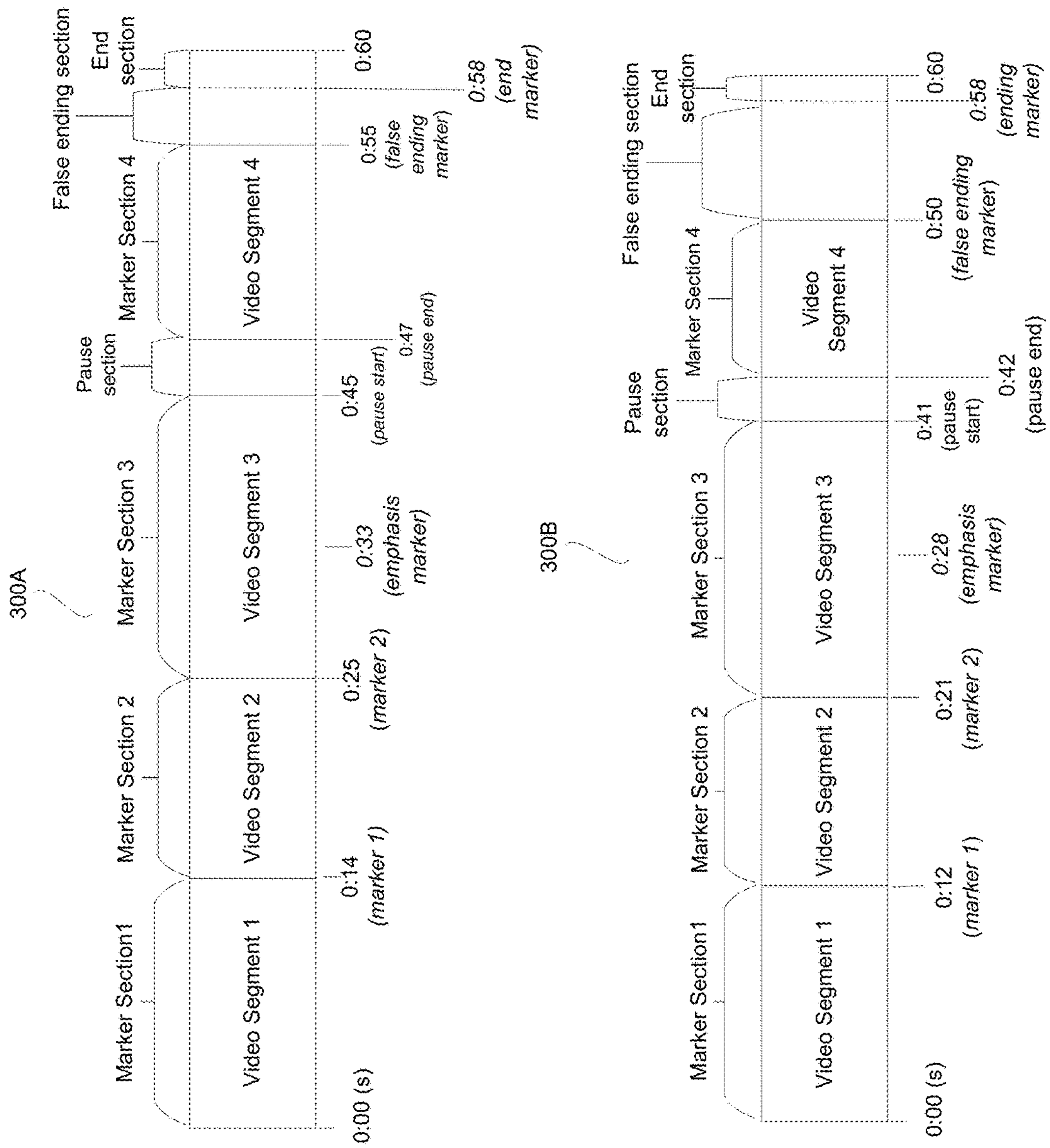
FIG. 3 illustrates examples of source content associated with composition parameter sets associated with a composition management system, in accordance with one or more embodiments of the present disclosure.

FIG. 3 illustrates an example of an initial version of source content 300A. As shown in FIG. 3A, the source content 300A includes multiple video segments (video segment 1, video segment 2, video segment 3, and video segment 4), a pause portion, and an end or closing portion. In an embodiment, a composition parameter set 115 associated with the source content 300A is generated and includes information identifying a total duration of the source content 300A (e.g., 60 seconds), corresponding transition markers (e.g., at 0:14, 0:25, and 0:55 seconds), an emphasis marker (e.g., at 0:33 seconds), a pause marker (e.g., starting at 0:45 seconds and having a pause duration of 0:02 seconds), a false ending marker location (e.g., at 0:55 seconds), and an end marker location denoting the beginning of the end section (e.g., at 0:58 seconds).

Figure 4:
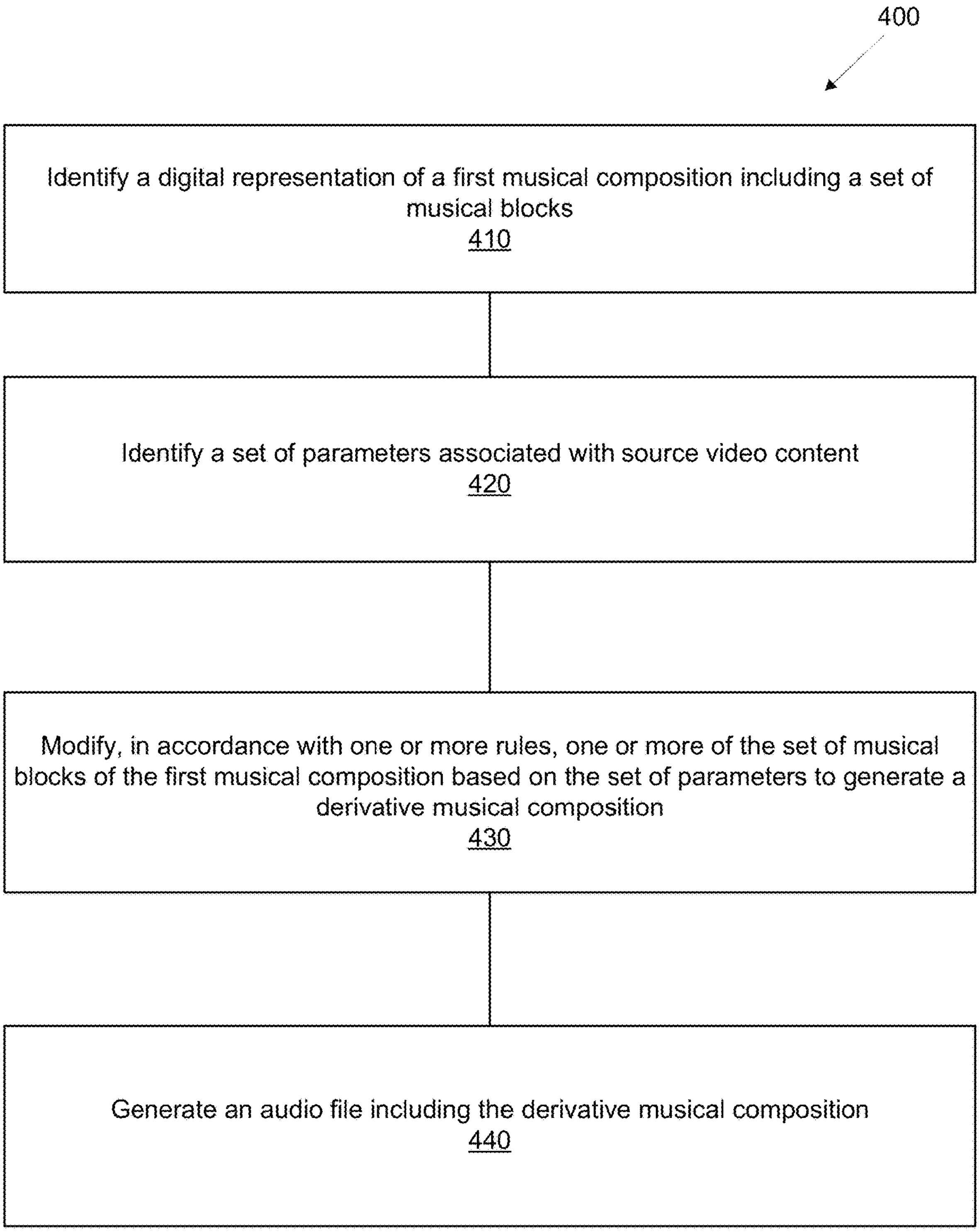
FIG. 4 illustrates an example method to generate an audio file including a derivative musical composition for use in connection with source content, in accordance with one or more embodiments of the present disclosure.

FIG. 4 illustrates a flow diagram relating to an example method 400 executable according to embodiments of the present disclosure (e.g., executable by derivative composition generator 116 of composition management system 110 shown in FIG. 1) to generate a derivative composition (e.g., derivative composition 117 of FIG. 1) based on a modified source composition (e.g., modified source composition 114 of FIG. 1) that meets or satisfies the one or more requirements of a composition parameter set (e.g., composition parameter set 115 of FIG. 1) associated with source content (e.g., source content 300 of FIG. 3).

It is to be understood that the flowchart of FIG. 4 provides an example of the many different types of functional arrangements that may be employed to implement operations and functions performed by one or more modules of the composition management system as described herein. Method 400 may be performed by a processing logic that may comprise hardware (e.g., circuitry, dedicated logic, programmable logic, microcode, etc.), software (e.g., instructions run on a processing device), or a combination thereof. In one embodiment, the composition management system executes the method 400 to generate a derivative or updated composition (e.g., a derivative composition 117 of FIG. 1) based on a first musical composition (e.g., a modified source composition) and a set of composition parameters (e.g., composition parameter set 115).

In operation 410, the processing logic identifies a digital representation of a first musical composition including a set of one or more musical blocks. In an embodiment, the first musical composition represents a musical score having a set of musical elements associated with a source composition. In an embodiment, the first musical composition includes the one or more musical blocks defining portions of the musical composition and associated boundaries or transitions. In an embodiment, the digital representation is a file (e.g., a MIDI file) including the musical composition and information identifying the musical block (e.g., musical block labels or identifiers). In an embodiment, the digital representation of the first musical composition is the modified source composition 114 of FIG. 1.

In an embodiment, the first musical composition can include one or more effects tracks that include musical elements subject to playback under certain conditions (e.g., a transition end track, a transition start track, an ends effect portion, etc.). For example, the first musical composition can include a transition start track that is played if its location in the musical composition follows a transition marker. In another example, the musical composition can include a transition end track that is played if its location in the musical composition precedes a transition marker.

In an embodiment, the musical composition can include information identifying one or more layers associated with a portion of the musical composition that is repeated. In an embodiment, the processing logic identifies "layering" information that defines which of the tracks are "activated" depending on a current instance of a repeat in a set of repeats. For example, on a first repeat of a set of repeats, a first track associated with a violin playing a portion of a melody can be activated or executed. In this example, on a second repeat of the set of repeats, a second track associated with a cello playing a portion of the melody can be activated and played along with the first track.

In an embodiment, the processing logic can identify and manage layering information associated with layering or adding additional instruments for each repetition to generate an enhanced musical effect to produce an overall sound that is deeper and richer each time the section repeats. In an embodiment, the modified source composition can include static or pre-set layering information which dictates how many times a section repeats and which additional instruments or notes are added on each repetition. Advantageously, in an embodiment, the processing logic can adjust or change the layering information to repeat a section one or more times. In an embodiment, one or more tracks can be specified to be included only on the Nth repetition of a given musical block or after. For example, the processing logic can determine a first track marked "Layer 1" in the modified source composition is to be included only in a second and third repetition of a musical block in a generated derivative composition (e.g., in accordance with operation 430 described below). In this example, the processing logic can identify a second track marked "Layer 2" in the modified source composition is to be included only in a third repetition of the musical block in the generated derivative composition.

In an embodiment, the digital representation of the first musical composition includes information identifying one or more tracks corresponding to respective virtual instruments configured to produce audio elements in accordance with the musical score, as described in detail above and shown in FIG. 2. In an embodiment, the first musical composition can include one or more additional sections including an end portion or section (e.g., end section 263 shown in FIG. 2), a false ending section, and one or more pause sections (e.g., a section corresponding to a pause portion of the source content).

In an embodiment, the digital representation of the first musical composition includes information identifying a set of one or more rules relating to the set of musical blocks of the first musical composition (also referred to as "block rules"). In an embodiment, the block rules can include a rule governing a shortening of a musical block (e.g., a rule relating to reducing the number of beats of a musical block). In an embodiment, the block rules can include a rule governing an elongating of a musical block (e.g., a rule relating to elongating or increasing the number of beats of a musical block). In an embodiment, the block rules can include a rule governing an elimination or removal of a last or final musical element (e.g., a beat) of a musical bar of a musical block. In an embodiment, the block rules can include a rule governing a repeating of at least a portion of the musical elements of a musical block. In an embodiment, the block rules can include AI-based elongation models that auto-extend a block in a musical way using tools such as chord progressions, transpositions, counterpoint and harmonic analysis. In an embodiment, the block rules can include a rule governing a logical hierarchy of rules indicating a relationship between multiple rules, such as, for example, identifying rules that are mutually exclusive, identifying rules that can be combined, etc.

In an embodiment, the block rules can include a rule governing transitions between musical blocks (also referred to as "transition rules"). The transition rules can identify a first musical block progression that is to be used as a preference or priority as compared to a second musical block progression. For example, a transition rule can indicate that a first musical block progression of musical block X1 to musical block Z1 is preferred over a second musical block progression of musical block X1 to musical block Y1. In an embodiment, multiple transition rules can be structured in a framework (e.g., a Markov decision process) and applied to generate a set of transition decisions identifying the progressions between a set of musical blocks.

In an embodiment, the digital representation of the first musical composition includes a set of one or more files (e.g., a comma-separated values (CSV) file) including information used to control how the respective tracks of the first musical composition are mixed (herein referred to as a "mixing file"). In an embodiment, the file can include information defining a mixing weight (e.g., a decibel (dB) level) of each of the respective tracks (e.g., a first mixing level associated with Instrument 1 Track of FIG. 2, a second mixing level associated with Instrument 2 Track of FIG. 2, a third mixing level associated with Instrument 3 Track of FIG. 2, etc.).

In an embodiment, the file can include information defining a panning parameter of the first musical composition. In an embodiment, the panning parameter or setting indicates a spread or distribution of a monaural or stereophonic pair signal in a new stereo or multi-channel sound field. In an embodiment, the panning parameter can be controlled using a virtual controller (e.g., a virtual knob or sliders) which function like a pan control or pan potentiometer (i.e., pan pot) to control the splitting of an audio signal into multiple channels (e.g., a right channel and a left channel in a stereo sound field).

In an embodiment, the digital representation of the first musical composition includes a set of one or more files including information defining virtual instrument presets that control how a virtual instrument program or module is instantiated (herein referred to as a "virtual instrument file"). For example, the digital representation of the first musical composition can include a virtual instrument file configured to implement a first instrument type (e.g., a piano). In this example, the virtual instrument file can identify an example preset that controls what type of piano is to be used (e.g., an electric piano, harpsichord, an organ, etc.)

In an embodiment, the virtual instrument file can be used to store and load one or more parameters of a digital signal processing (DSP) module (e.g., an audio processing routine configured to take an audio signal as an input, control audio mastering parameters such as compression, equalization, reverb, etc., and generate an audio signal as an output). In an embodiment, the virtual instrument file can be stored in a memory and loaded from a memory address as bytes.

With reference to FIG. 4, in operation 420, the processing logic identifies a set of parameters associated with source content. In an embodiment, the processing logic receives the set of parameters (e.g., the composition parameter set 115 of FIG. 1) from an end-user system (e.g., end-user system 10 of FIG. 1). In an embodiment, the set of parameters defines or characterizes features of the source content for use in generating a musical composition (e.g., a derivative musical composition 117 of FIG. 1) that matches the source content. In an embodiment, the set of parameters defines one or more requirements associated with the source content that are to be satisfied by a resulting musical composition. In an embodiment, the set of parameters (e.g., composition parameter set 115 of FIG. 1) are based on and defined by the source content (e.g., the parameters are customized and established in view of the source content) and can be used by the processing logic to generate a musical composition that satisfies or meets the requirements defined by the set of parameters and is customized or tailored to the underlying source content.

In an embodiment, as described above, the set of parameters associated with the source content can include, but are not limited to, information identifying a duration (e.g., a time span in seconds) of the source content, time locations associated with transition markers associated with transitions in the source content (e.g., one or more times in seconds measured from a start of the source content), a false ending marker (e.g., a time in seconds measured from a start of the source content) associated with a false ending of the source content, one or more pause markers (e.g., one or more times in seconds measured from a start of the source content and a length of the pause duration) identifying a pause in the source content), one or more emphasis markers (e.g., one or more times in seconds measured from a start of the source content) associated with a point of emphasis within the source content, and an ending location marker (e.g., a time in seconds measured from a start of the source content) marking an end of the video images of the source content.

In operation 430, the processing logic modifies, in accordance with one or more rules and the set of parameters, one or more of the set of musical blocks of the first musical composition to generate a derivative musical composition. In an embodiment, the one or more rules (also referred to as "composition rules") are applied to the digital representation of the first musical composition to enable a modification or change to one or more aspects of the one or more musical blocks to conform to or satisfy one or more of the set of parameters associated with the source content. In an embodiment, the derivative musical composition is generated and includes one or more musical blocks of the first musical composition that have been modified in view of the execution of the one or more composition rules in view of the set of parameters associated with the source content.

In an embodiment, the derivative musical composition can include a modified musical block (e.g., a first modified version of Musical Block 1 of FIG. 2) having one or more modifications, changes, or updates to a musical block parameter (e.g., beat duration, block duration, transition effects, etc.) as compared to a corresponding musical block of the first musical composition (e.g., Musical Block 1 shown in FIG. 2). In an embodiment, the processing logic can apply any combination of multiple composition rules to any combination of musical blocks to generate a derivative musical composition configured to match the source content.

In an embodiment, the composition is formed by combining rules based on optimizing a loss function (e.g., a function that maps an event or values of one or more variables onto a real number representing a "cost" associated with the event). In an embodiment, the loss function is configured to determine a score representing the musicality (e.g., a quality level associated with aspects of a musical composition such as melodiousness, harmoniousness, etc.) of any such composition. In an embodiment, the loss function rule can be applied to an arrangement of modified musical blocks.

Figure 5:
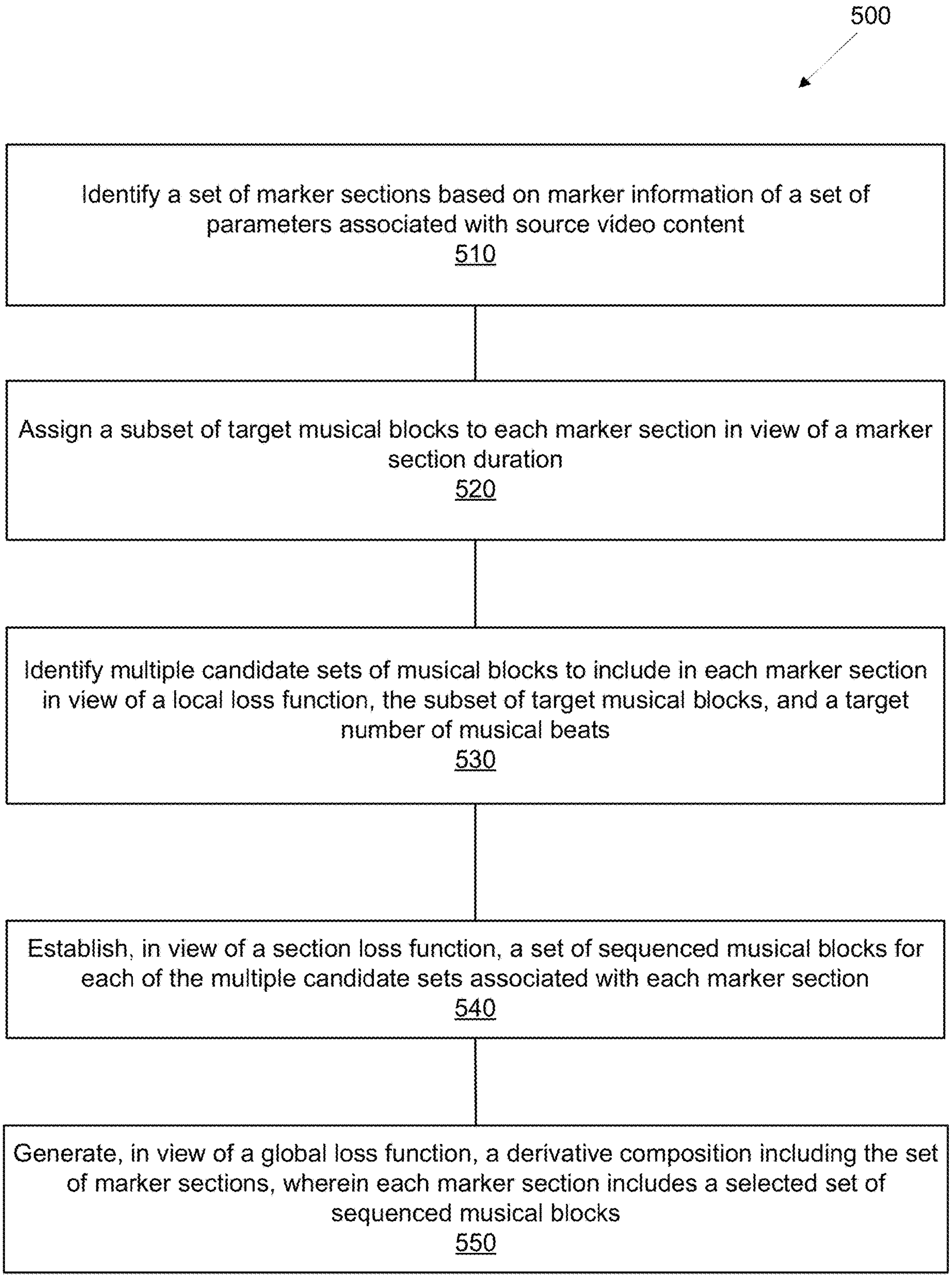
FIG. 5 illustrates an example method to generate a derivative musical composition associated with a composition management system, in accordance with one or more embodiments of the present disclosure.

In an embodiment, an AI algorithm (described in greater detail below) is then employed to find the optimal configuration of blocks that attempts to minimize the total cost of a composition as implied by the loss function, subject to user constraints such as duration, transition markers etc. In an embodiment, the derivative musical composition is generated in response to identifying an arrangement of modified musical blocks having the highest relative musicality score as compared to other arrangements of modified musical blocks. FIG. 5, described in greater detail below, illustrates an example optimization method 500 that can be executed as part of operation 430 of FIG. 4.

FIG. 5 illustrates a flow diagram relating to an example method 500 executable according to embodiments of the present disclosure (e.g., executable by derivative composition generator 116 of composition management system 110 shown in FIG. 1) to identify and modify one or more of the set of musical blocks of the first musical composition in accordance with one or more rules and the set of parameters to generate a derivative musical composition. In an embodiment, the processing logic performs a composition process (method 500) to approximate an optimal composition to use as the derivative composition to be rendered into an audio file in a next phase (e.g., operation 440) of the method 400.

It is to be understood that the flowchart of FIG. 5 provides an example of the many different types of functional arrangements that may be employed to implement operations and functions performed by one or more modules of the composition management system as described herein. Method 500 may be performed by a processing logic that may comprise hardware (e.g., circuitry, dedicated logic, programmable logic, microcode, etc.), software (e.g., instructions run on a processing device), or a combination thereof. In one embodiment, the composition management system executes the method 500 to optimize the modifications of the one or more of the set of musical blocks of the first musical composition (e.g., the modified source composition 114 of FIG. 1) in accordance with one or more rules and the set of parameters (e.g., the composition parameter set 115 of FIG. 1) to compose an optimized version of the derivative composition (e.g., the derivative musical composition 117 of FIG. 1).

In an embodiment, the processing logic of the derivative composition generator 116 of FIG. 1 executes the composition method 500 to identify and modify an arrangement of musical blocks in view of a loss function to minimize the loss of the resulting derivative composition, subject to the constraints as defined by the set of parameters (e.g., the composition parameter set 115 of FIG. 1). In an embodiment, the loss function can include multiple parts including a local loss function, a section loss function, and a global loss function, as described in greater detail below with respect to method 500.

In operation 510, the processing device identifies a set of marker sections based on marker information of the set of parameters associated with the source content. For example, as shown in FIG. 6, if the set of parameters associated with the source content includes information identifying three markers (e.g., marker 1, marker 2, and marker 3), the processing device identifies a set of marker sections including four marker sections.

In operation 520, the processing logic assigns a subset of target musical blocks to each marker section in view of a marker section duration. In an embodiment, given a set of marker sections (and corresponding marker section durations), the processing logic assigns a list of "target blocks" or "target block types" for each marker section that constitutes a high-level arrangement of the composition.

In an embodiment, each marker section type is associated with a list or set of target blocks. In an embodiment, the set of target blocks includes a list of musical block types identified for inclusion in a marker section, if possible (e.g., if the target blocks types fit within the marker section in view of applicable size constraints). In an embodiment, the target blocks are promoted by the loss function inside the marker section in which the target blocks are active to incentivize selection for that marker section. For example, with reference to FIG. 6, marker section 1 can be associated with a first set of target blocks including musical blocks X1, Y2 and Z1 (with shortening and elongation rules applied).

Figure 6:
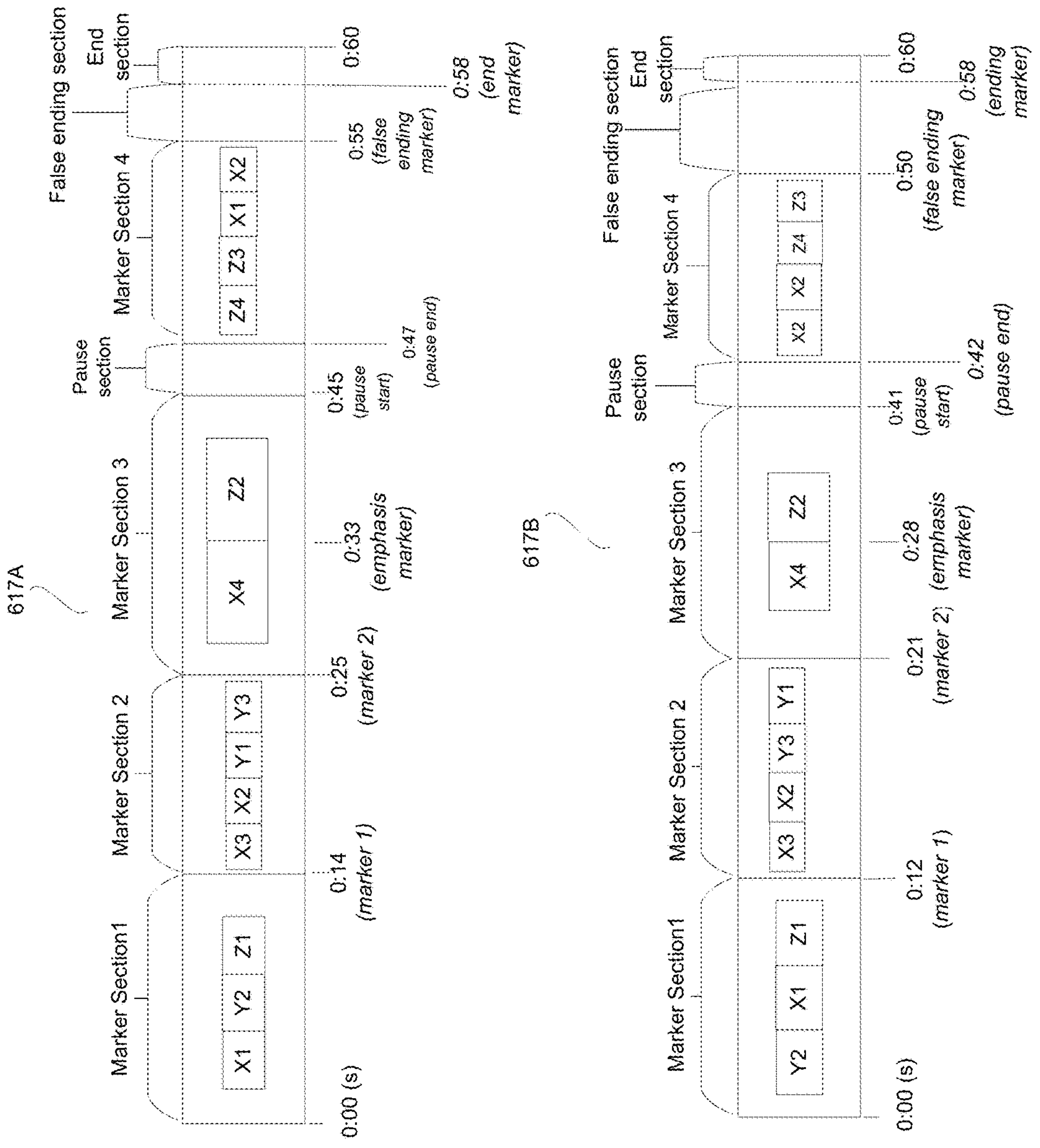
FIG. 6 illustrates example musical compositions generated in accordance with methods executed by a composition management system, in accordance with one or more embodiments of the present disclosure.

For example, as shown in FIG. 6, a first marker section can be assigned a first subset of target blocks including musical blocks X1, Y2, and Z2, a second marker section can be assigned a second subset of target blocks including musical blocks X3, X2, Y1, and Y3, a third marker section can be assigned a third subset of target blocks including musical blocks X4 and Z2, and a fourth marker section can be assigned a fourth subset of target blocks including musical blocks Z4, Z3, X1, and X2. In an embodiment, the set of marker sections and assigned subsets of target musical blocks represents a road-map or arrangement for the derivative composition 617A. For example, as shown in FIG. 6, the sequence of the subset of musical blocks for marker section 1 of the derivative composition 617A is identified as X1-Y2-Z1.

In an embodiment, the initial arrangement can follow the order of musical blocks in an input composition (e.g., the modified source composition 114 provided to the derivative composition generator 116 of FIG. 1). In an embodiment, the process logic can determine that a number of marker sections for the derivative composition being generated is less than the input composition (e.g., the modified source composition 114 of FIG. 1), and in response, the processing logic selects which musical blocks are to be removed. In an embodiment, when the number of marker sections is greater than the number of musical blocks in the input composition, the processing logic selects which musical blocks to repeat.

In operation 530, the processing logic identifies musical blocks to "pack" or include in each marker section based on the subset of target musical blocks. In an embodiment, multiple candidate sets of musical blocks are identified for inclusion in each marker section in view of a local loss function, the subset of target musical blocks, and the target number of musical beats, as described herein. The identified musical blocks may or may not be edited according to one or more rules (e.g., the elongation, truncation and AI rules) that are applicable to each block. The local loss function assigns a loss for each candidate block and its edit. The local loss function considers the length of the block, the number of edits made, etc. in order to generate a score that is related to the concept of musical coherence. In particular, the local loss function gives lower loss to those musical blocks in the target block list (e.g., the subset of target musical blocks) in order to incentivize their selection. For example, a first edit (e.g., a cut in the middle of a musical block) can result in a local loss function penalty of 5. In another example, a second edit (e.g., cutting the first beat of a final bar of a musical block) can result in a local loss function penalty of 3. In an embodiment, the processing logic can apply the local loss function (also referred to as a "block loss function") to a given musical block to determine it is optimal to cut, delete or remove the last two beats of a musical block rather than to remove a middle section of the musical block. In an embodiment, the local loss function may not take into account a musical block's context (i.e., the musical blocks that come before and after it in the composition). In an embodiment, the local loss function may identify a target block that specifies one block is to be used instead of another block (e.g., that an X1 block is preferable to a Y1 block) for a given marker section.

In an embodiment, in operation 530, the processing device executes a (linear) integer programming algorithm to pack different volumes or subsets of the musical blocks into the marker sections. In an embodiment, the processing logic identifies the (locally) optimal subset of musical blocks and block rule applications to achieve the target number of beats with the lowest total local loss.

In an embodiment, the marker section durations are expressed in terms of "seconds", while the marker sections are packed with an integer number of musical beats. The number of beats is a function of the tempo of the track which is allowed to vary slightly. Accordingly, in an embodiment, this enables a larger family of solutions, but can result in the tempo to vary across sections which can produce a jarring sound. In an embodiment, an additional convex-optimization algorithm can be executed to make the tempo shifts more gradual and therefore much less jarring, as described in greater detail below.

For example, the processing logic can identify multiple candidate sets including a first candidate set, a second candidate set . . . and an Nth candidate set. Each of the candidate sets can include a subset of target musical blocks that satisfy the applicable block rules and target beat requirements. For example, the processing logic can identify one of the multiple candidate sets for a first marker section (e.g., marker section 1) including a first subset of musical blocks (e.g., musical block X1, musical block Y2, musical block Z1). In this example, the processing logic can identify one of the multiple candidate sets for a second marker section (e.g., marker section A22) including a second subset of musical blocks (e.g., musical block X3, musical block X2, musical block Y1, musical block Y3). The processing logic can further identify one of the multiple candidate sets for a third marker section (e.g., marker section 3) including a third subset of musical blocks (e.g., musical block X4 and musical block Z2). In this example, the processing logic can further identify one of the multiple candidate sets for a fourth marker section (e.g., marker section 4) including a fourth subset of musical blocks (e.g., musical block Z4, musical block Z3, musical block X1, and musical block X2).

In operation 540, the processing device establishes, in view of a section loss function, a set of sequenced musical blocks for each of the multiple candidate sets associated with each marker section. In an embodiment, the processing device can establish a desired sequence for the subset of musical blocks for each of the candidate sets. In an embodiment, the section loss function is configured to score the subset of musical blocks included in each respective marker section. In an embodiment, the section loss function sums the local losses of the constituent musical blocks within a marker section. In an embodiment, the processing logic re-orders or modifies an initial sequence or order of the subset of musical blocks in each of the marker sections (e.g., the random or unordered subsets of musical blocks shown in composition 617A of FIG. 6) using a loss function process based on a section loss function.

In an embodiment, using the unordered (e.g., randomly ordered) subset of musical blocks in each of the candidate sets processed in operation 530, for each marker section, the processing logic identifies and establishes a sequence or order of the musical blocks having a lowest section loss. In an embodiment, the processing logic uses a heuristic or rule to identify an optimal or desired sequence for each of the musical block subsets. In an embodiment, the heuristic can be derived from the loss terms in the section loss. For example, a first selected order of musical blocks may be: X1, Z1, Y1. In this example, a heuristic may be applied to reorder the musical blocks to match an original sequence of X1, Y1, Z1. In an embodiment, the processing logic can apply a transition rule to identify the optimal or desired set of sequenced musical blocks for each of the candidate sets. For example, a transition rule can be applied that indicates that a first sequence of X1, Z1, Y1 it to be changed to a second (or preferred) sequence of X1, Y1, Z1.

In another example, a heuristic can be applied to identify if a block type has been selected more than once and generate a reordering to minimize repeats. For example, an initial ordering of X1, X1, X1, Y1, Z1 may be selected. In this example, a heuristic can be applied to generate a reordered sequence of X1, Y1, X1, Z1, X1. As shown, the reordered sequence generated as a result of the application of the heuristic minimizes repeats as compared to the original sequence. In an embodiment, the section loss function may or may not take into account transitions between marker sections.

In operation 550, the processing logic generates, in view of a global loss function, a derivative composition including the set of marker sections, wherein each marker section includes a selected set of sequenced musical blocks. In an embodiment, the global loss function is configured to score an entire composition by summing the section losses of the marker sections. In an embodiment, the global loss function may add loss terms relating to the transitions between marker sections. For example, a particular transition block may be preferred to transition from an X1 block to a Y1 block such that switching the particular transition block into the composition results in a reduced global loss. In an embodiment, the global loss function can be applied to identify transition losses that quantify the loss incurred from transitioning from one block to the next. For example, in a particular piece, it may be desired to transition from X1 to Y1, but not desired to transition from X1 to Z1. In an embodiment, transition losses are used to optimize orderings both within a marker section and across transition boundaries. In an embodiment, using the global loss function, the processing logic generates the derivative composition including a selected set of sequenced musical blocks for each of the marker sections.

In an example, in operation 550, the processing logic can evaluate a first marker section including musical block X1 and a second marker section including musical blocks X1-Y1-Z1 using a global loss function (e.g., a global heuristic). For example, the global heuristic may indicate that a same musical block is not to be repeated at a transition between adjacent marker sections (e.g., when marker section 1 and marker section 2 are stitched together). In view of the application of this global heuristic, the selected set of sequenced musical blocks for marker section 2 is established as Y1-X1-Z1 in order to comport with the global heuristic. It is noted that in this example, the selected sequence of musical blocks in marker section 2 are no longer locally optimal, but the sequence is selected to optimize in view of the global loss function (e.g., the global heuristic).

In an embodiment, the processing logic can adjust a tempo associated with one or more marker sections such that a number of beats in each marker section fits or fills the associated duration. In an embodiment, given a final solution of ordered blocks (e.g., the derivative composition resulting from operation 550), the processing logic can apply a smoothing technique to adjust the tempo of each of the blocks such that the duration of each of the marker sections matches its specified duration. For example, the processing logic can set an average BPM of each section to the number of beats in the section divided by a duration of the section (e.g., a duration in minutes). According to embodiments, the processing logic can apply a smoothing technique wherein a constant BPM equal is set to an average BPM for each section. Another example smoothing technique can include changing the BPM continuously to match a required average BPM of each section, while simultaneously avoiding significant BPM shifts.

FIG. 6 illustrates example derivative composition 617A as generated in accordance with method 500 of FIG. 5. As shown, a first derivative composition 617A can be generated to include a first marker section (marker section 1) including a selected sequence of musical blocks X1-Y2-Z1, a second marker section (marker section 2) including a selected sequence of musical blocks X3-X2-Y1-Y3, a third marker section (marker section 3) including a selected sequence of musical blocks X4-Z2, and a fourth marker section (marker section 4) including a selected sequence of musical blocks Z4-Z3-X1-X2.

In an embodiment, in response to one or more changes or updates (e.g., changes or updates to the composition parameter set 115 of FIG. 1) the processing logic can repeat the execution of one or more operations of method 500 to generate a new or updated derivative composition 617B that is adjusted or adapted to satisfy the updated composition parameter set 115. FIG. 6 illustrates an example derivative composition 617B that is generated in accordance with method 500 of FIG. 5 in view of one or more adjustments associated with derivative composition 617A (e.g., derivative composition 617B is an updated version of derivative composition 617A).

As shown in FIG. 6, the derivative composition 617B can be generated to include a first marker section (marker section 1) including a selected sequence of musical blocks Y2-X1-Z1, a second marker section (marker section 2) including a selected sequence of musical blocks X3-X2-Y3-Y1, a third marker section (marker section 3) including a selected sequence of musical blocks X4-Z2, and a fourth marker section (marker section 4) including a selected sequence of musical blocks X2-X2-Z4-Z3.

In the example shown in FIG. 6, the musical blocks (e.g., X1, Y1, etc.) in the derivative composition (e.g., composition 617A, 617B) are modified or edited versions of the original musical blocks of the modified source composition (e.g., modified source composition 114 of FIG. 1). In the example shown in FIG. 6, the processing logic identifies a selected set of sequenced musical blocks Y2-X1-Z1 to be included in marker section 1 of the derivative musical composition. As described above, the processing logic and apply one or more heuristic rules to a first version of the derivative composition 617A to establish an updated or different sequence of the musical blocks in a second version of derivative composition 617B. In an example, the processing logic establishes the first version of the derivative composition 617A with marker section 1 including musical blocks X1-Y2-Z1. In this example, the processing logic can apply one or more heuristics, as described above, to generate a second version of derivative composition 617B including an updated sequence of Y2-X1-Z1 for marker section 1.

In an embodiment, the above can be performed by using one or more heuristics which govern the generation of a derivative composition or an updated derivative composition. For example, a first heuristic can be applied to generate a derivative composition that remains close to the modified source composition and a second heuristic that minimizes musical block repeats. In an embodiment, the derivative composition can be generated in view of transition losses that quantify the loss incurred from transitioning from one musical block to the next block.

With reference to FIG. 4, in operation 440, the processing logic generates an audio file including the derivative musical composition. In an embodiment, operation 440 is performed in response to a completion of method 500 shown in FIG. 5, as described above. In an embodiment, the derivative musical composition is generated as a MIDI file including a set of MIDI data associated with MIDI events for use in rendering the audio information and generating the audio file. In an embodiment, the set of MIDI events can include, but are not limited to: a sequence of musical elements (e.g., notes); one or more meta events identifying changes to one or more characteristics including tempo, time signature, key signature, playhead information (e.g., temporal context information used by low-frequency oscillators and context-sensitive concatenative synthesizers); control change information used to change instrument characteristics (e.g., sustain pedal on/off); metadata information enabling a target or desired instrument to be instantiated with a target or desired preset; and time-dependent mixing parameter control information.

In an embodiment, in operation 430, the processing logic renders the audio file by performing a rendering process to map the MIDI data of the derivative musical composition to audio data of the audio file. In an embodiment, the processing logic can execute a rendering process that includes a machine-learning synthesis approach, a concatenative/parametric synthesis approach, or a combination thereof.

In an embodiment, the rendering process includes executing a plug-in host application to translate the MIDI data of the derivative musical composition into audio output via a single function call and expose the function to a suitable programming language module (e.g., a Python programming language module) to enable distributed computation to generate the audio file. In an embodiment, the plug-in host application can be an audio plug-in software interface that integrates software synthesizers and effects units into one or more digital audio workstations (DAWs). In an embodiment, the plug-in software interface can have a format associated with a Virtual Studio Technologies (VST)-based format (e.g., a VST-based plug-in).

In an embodiment, the plug-in host application provides a host graphical user interface (GUI) to enable a user (e.g., a musician) to interact with the plug-in host application. In an embodiment, interactions via the plug-in GUI can include testing different present sounds, saving presets, etc.

In an embodiment, the plug-in host application includes a module (e.g., a Python module) or command-line executable configured to render the MIDI data (e.g., MIDI tracks). In an embodiment, the plug-in host application is configured to load a virtual instrument (e.g., a VST instrument), load a corresponding preset, and render a MIDI track. In an embodiment, the rendering of the MIDI track can be performed at rendering speeds of approximately 10 times real-time processing speeds (e.g., a 5 minute MIDI track can be rendered in approximately 30 seconds).

In an embodiment, the plug-in host application is configured to render a single instrument. In this embodiment, rendering a single instrument enables track rendering to be assigned to different processing cores and processing machines. In this embodiment, rendering times can be improved and optimized to allocate further resources to tracks that are historically used more frequently (e.g., as determined based on track rendering historical data maintained by the composition management system).

In an embodiment, the rendering process further includes a central orchestrator system (e.g., a Python-based rendering server) configured to split the derivative musical composition into individual tracks and schedules jobs on one or more computing systems (e.g., servers) configured with one or more plug-ins for rendering each MIDI file to audio. In an embodiment, the MIDI file plus the plug-in settings associated with the derivative musical composition from the modified source composition (e.g., modified source composition 114 of FIG. 1) are provided as inputs for each individual job. Advantageously, this enables the rendering to be completed in parallel across different computing cores and computing machines, thereby reducing render times.

In an embodiment, once the jobs are complete, the orchestrator module schedules a mixing job or process. In an embodiment, the mixing job or process can be implemented using combinations of stems (i.e., stereo recordings sourced from mixes of multiple individual tracks), wherein level control and stereo panning are linear operations based on the stems. In an embodiment, once mixing is complete, a mastering job or process is performed. In an embodiment, the mastering process can be implemented using digital signal processing functions in a processing module (e.g., Python or a VST plug-in).

In an embodiment, the output from the jobs are incrementally streamed to a mixing job or process, which begins mixing once all of the jobs are started. In an embodiment, as the mixing process is incrementally completed, it is streamed to the mastering job. In this way, a pipeline is created that reduces the total time required to render the complete audio file.

In an embodiment, a first set of one or more instruments are rendered using the concatenative/parametric approach supported by the VST plug-in format. In an embodiment, a second set of one or more other instruments are rendered using machine-learning based synthesis processing (referred to as machine-learning rendering system). In an embodiment, a dataset for the machine-learning rendering system is collected in a music studio setting and includes temporally-aligned pairs of MIDI files and Waveform Audio File (WAV) files (e.g., .wav files). In an embodiment, the WAV file includes a recording of a real instrument or a rendering of a virtual instrument (e.g., VST file). In an embodiment, the machine-learning rendering system generates WAV-based audio based on an unseen/new MIDI file, such that the WAV-based audio substantially matches the sound of the real instrument. In an embodiment, the sound matching is performed by using a multi-scale spectral loss function between the real-instrument spectrum and the spectrum generated by the machine-learning rendering system. In an embodiment, employing the machine-learning rendering system eliminates dependence on a VST host, unlocking GPU-powered inference to generate WAV files at a faster rate as compared to systems that are dependent on the VST host.

Figure 7:
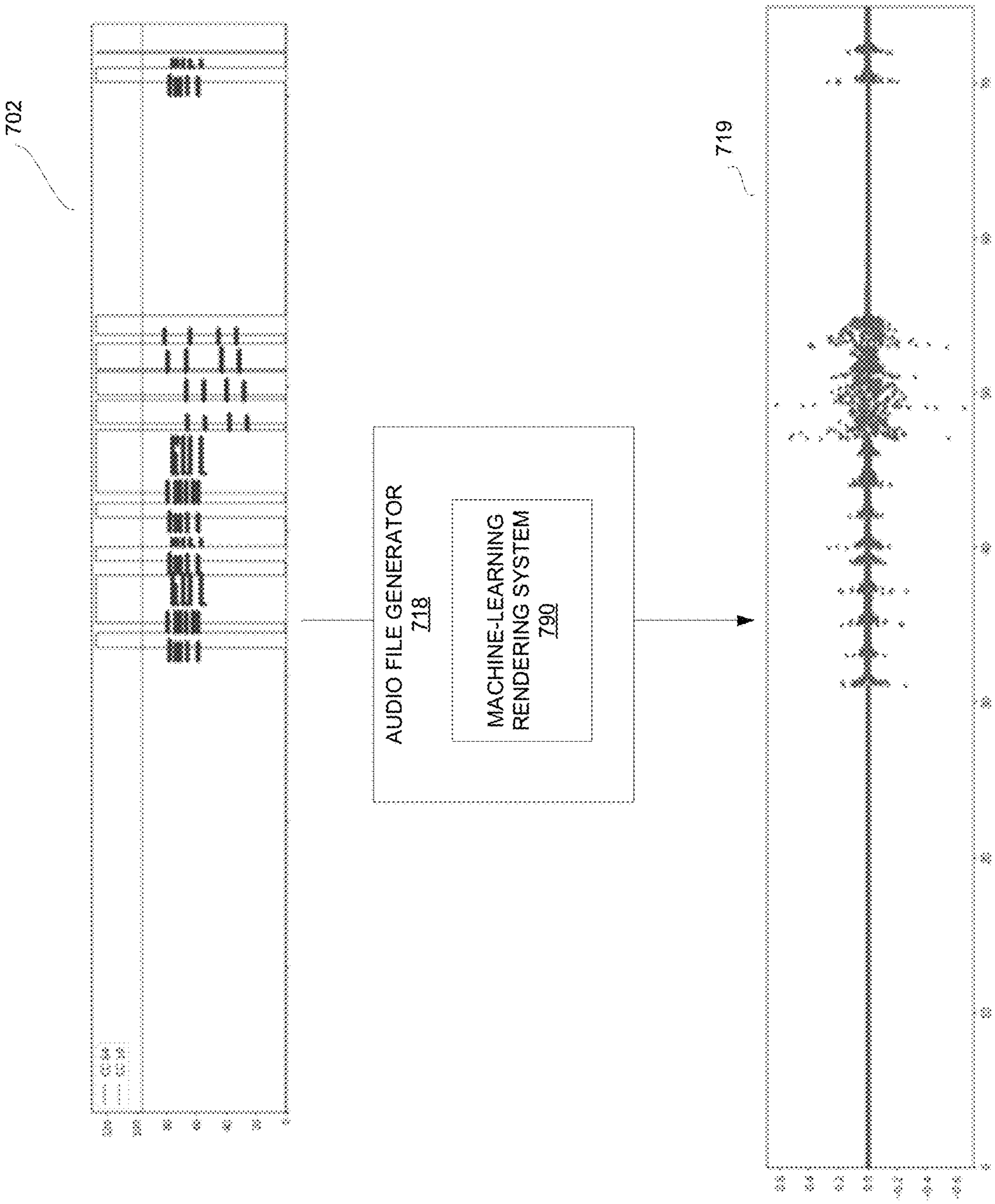
FIG. 7 illustrates an example audio file generated by an audio file generator of a composition management system, in accordance with one or more embodiments of the present disclosure.

FIG. 7 illustrates an example machine-learning rendering system 790 of an audio file generator 718 configured to perform operations of the rendering process according to embodiments of the present disclosure. As illustrated in FIG. 7, the machine-learning rendering system 690 receives a temporally-arranged representation of MIDI data (including notes and control signals) 602 and applies neural network processing to generate a corresponding audio output file 619 (e.g., a .wav file). In an embodiment, the machine-learning rendering system 690 can be configured to implement one or more neural networks such as, for example, deep neural networks (DNNs), a recurrent neural network (RNN), and a sequence-to-sequence modeling network such as long short term memory (LSTM) network and a Conditional WaveNet architecture (e.g., a deep neural network to generate audio with specific characteristics).

In an embodiment, the processing logic can include a rules engine or AI-based module to execute one or more rules relating to the set of musical blocks that are included in the first musical composition.

According to embodiments, one or more operations of method 400 and/or method 500, as described in detail above, can be repeated or performed iteratively to update or modify the derivative composition (e.g., derivative composition 117 of FIG. 1) in view of changes, updates, or modifications to the source content. In an embodiment, an end-user may make changes to the source content such that a new or updated derivative composition is generated. For example, as shown in FIG. 3, first or initial source content 300A may be processed to identify a corresponding first or initial composition parameter set (e.g., composition parameter set 115 of FIG. 1) for use in generating a first or initial derivative composition. In an embodiment, one or more changes to the source content may be made (e.g., by the end-user system 10 of FIG. 1) to produce new or updated source content 300B of FIG. 3. As shown, source content 300B includes different parameters (e.g., adjusted segment lengths, modified emphasis marker locations, etc.) as compared to the initial source content 300A.

In an embodiment, in response to the changes to the source content, an updated or new composition parameter set is generated and identified for use (e.g., in operation 420 of method 400 of FIG. 4) in generating a new or updated derivative musical composition. Advantageously, the composition management system of the present disclosure is configured to dynamically generate audio files based on derivative musical compositions for use with updated source content. This provides significant flexibility to an end-user (e.g., a creative work producer) to implement and effectuate changes to the source content at any stage of the production process and have those changes incorporated into a modified or updated derivative musical composition generated by the composition management system described herein.

Figure 8:
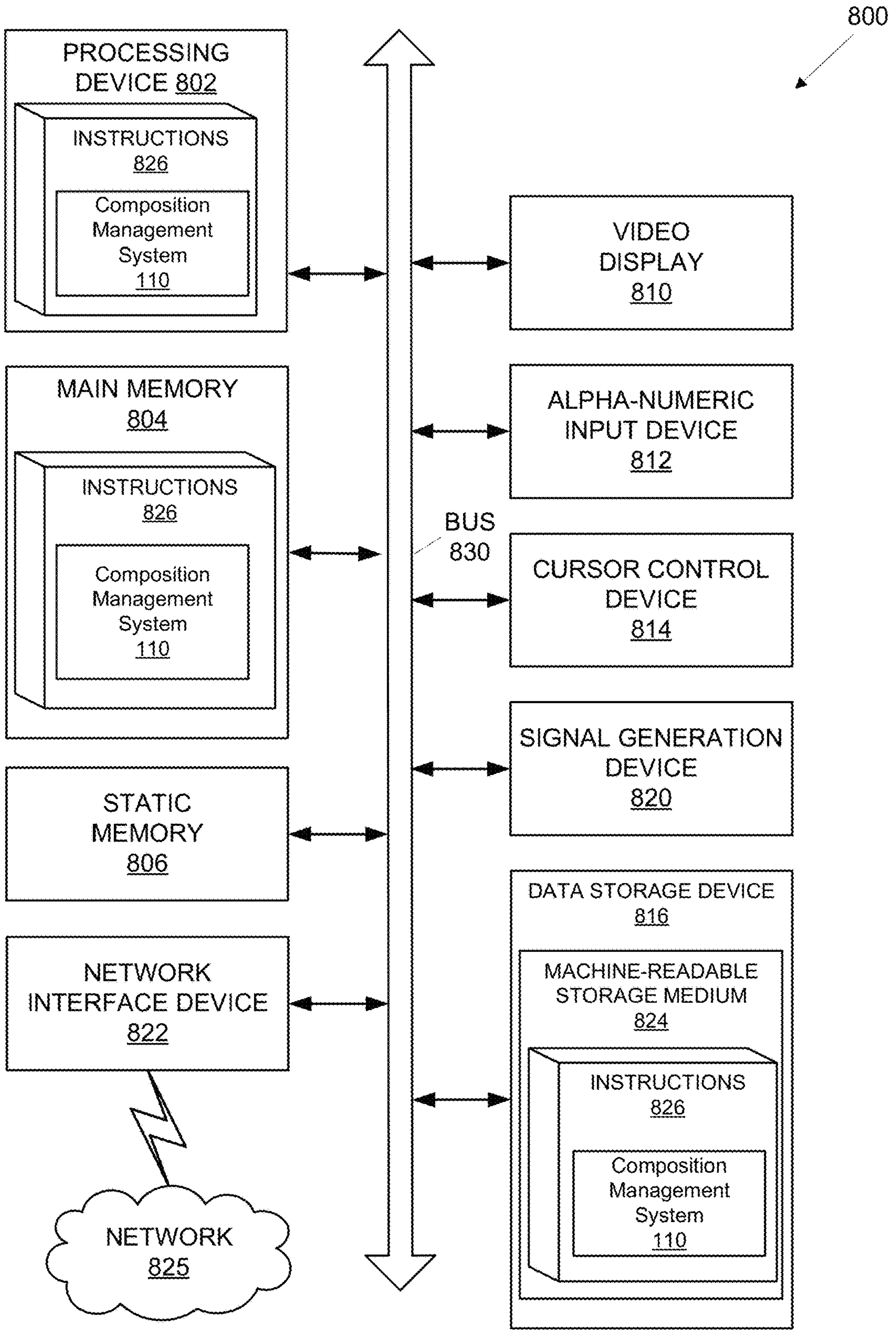
FIG. 8 illustrates an example computer system operating in accordance with embodiments of the present disclosure.

FIG. 8 illustrates an example computer system 800 operating in accordance with some embodiments of the disclosure. In FIG. 8, a diagrammatic representation of a machine is shown in the exemplary form of the computer system 800 within which a set of instructions, for causing the machine to perform any one or more of the methodologies discussed herein, may be executed. In alternative embodiments, the machine 800 may be connected (e.g., networked) to other machines in a local area network (LAN), an intranet, an extranet, or the Internet. The machine 800 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 800. Further, while only a single machine is illustrated, the term "machine" shall also be taken to include any collection of machines that individually or jointly execute a set (or multiple sets) of instructions to perform any one or more of the methodologies discussed herein.

The example computer system 800 may comprise a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 816), which may communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute a composition management system for performing the operations and steps discussed herein. For example, the processing device 802 may be configured to execute instructions implementing the processes and methods described herein, for supporting and implementing a composition management system, in accordance with one or more aspects of the disclosure.

Example computer system 800 may further comprise a network interface device 822 that may be communicatively coupled to a network 825. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 820 (e.g., a speaker).

Data storage device 816 may include a computer-readable storage medium (or more specifically a non-transitory computer-readable storage medium) 824 on which is stored one or more sets of executable instructions 826. In accordance with one or more aspects of the disclosure, executable instructions 826 may comprise executable instructions encoding various functions of the composition management system 110 in accordance with one or more aspects of the disclosure.

Executable instructions 826 may also reside, completely or at least partially, within main memory 804 and/or within processing device 802 during execution thereof by example computer system 800, main memory 804 and processing device 802 also constituting computer-readable storage media. Executable instructions 826 may further be transmitted or received over a network via network interface device 822.

While computer-readable storage medium 824 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "generating," "modifying," "selecting," "establishing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

identifying a first set of parameters associated with video content;

modifying, in accordance with one or more rules, one or more musical blocks of a first musical composition based on the first set of parameters to generate a second musical composition corresponding to the video content;

identifying a second set of parameters associated with the video content;

modifying, in accordance with the one or more rules, one or more musical blocks of the second musical composition based on the second set of parameters to generate a third musical composition corresponding to the video content; and generating, by a processing device, an audio file comprising the third musical composition.

2. The method of claim 1, further comprising:

identifying a third set of parameters associated with an updated version of the video content; and modifying the third musical composition based on the third set of parameters to generate a fourth musical composition.

3. The method of claim 1, further comprising:

receiving, from a source system, a digital representation of the first musical composition.

4. The method of claim 1, further comprising:

identifying a plurality of tracks corresponding to the first musical composition, wherein each of the plurality of tracks defines a section of a musical score associated with a virtual instrument type; and assigning a first virtual instrument to a first track of the plurality of tracks, wherein the first virtual instrument processes a portion of event data associated with a first virtual instrument type to generate a first audio output.

5. The method of claim 1, wherein the modifying further comprises:

adjusting a beat duration of at least one musical block of the first musical composition.

6. The method of claim 1, wherein the modifying further comprises:

adjusting a tempo associated with a first marker section of a plurality of marker sections associated with the first musical composition by setting a number of beats in a first subset of musical blocks assigned to the first marker section in view of a duration of the first marker section.

7. A system comprising:

a memory to store instructions; and a processing device, operatively coupled to the memory, to execute the instructions to perform operations comprising:

identifying a first set of parameters associated with video content;

modifying, in accordance with one or more rules, one or more musical blocks of a first musical composition based on the first set of parameters to generate a second musical composition corresponding to the video content;

identifying a second set of parameters associated with the video content;

modifying, in accordance with the one or more rules, one or more musical blocks of the second musical composition based on the second set of parameters to generate a third musical composition corresponding to the video content; and generating an audio file comprising the third musical composition.

8. The system of claim 7, wherein the modifying further comprises adjusting a beat duration of at least one musical block of the first musical composition.

9. The system of claim 7, the operations further comprising:

assigning a subset of musical blocks to each of a plurality of marker sections of the first musical composition in view of a marker section duration.

10. The system of claim 9, the operations further comprising:

identifying a plurality of candidate sets of musical blocks to include in each marker section of the plurality of marker sections in view of a first loss function, the subset of musical blocks, and a target number of musical beats.

11. The system of claim 10, the operations further comprising:

establishing, in view of a second loss function, a set of sequenced musical blocks for each of the plurality of candidate sets of musical blocks associated with each marker section.

12. The system of claim 11, wherein the second musical composition comprises the plurality of marker sections, wherein the set of sequenced musical blocks of each of the plurality of marker sections is selected from the plurality of candidate sets of musical blocks in view of a third loss function.

13. The system of claim 9, the operations further comprising:

adjusting a tempo associated with a first marker section of the plurality of marker sections by setting a number of beats in a first subset of musical blocks assigned to the first marker section in view of a duration of the first marker section.

14. The system of claim 7, wherein the file comprises event data in a first format.

15. The system of claim 14, the operations further comprising:

mapping the event data in the first format to audio data in a second format; and generating an audio file comprising the audio data in the second format.

16. A non-transitory computer readable storage medium comprising instructions that, when executed by a processing device, cause the processing device to perform operations comprising:

identifying a first set of parameters associated with video content;

modifying, in accordance with one or more rules, one or more musical blocks of a first musical composition based on the first set of parameters to generate a second musical composition corresponding to the video content;

identifying a second set of parameters associated with the video content;

modifying, in accordance with the one or more rules, one or more musical blocks of the second musical composition based on the second set of parameters to generate a third musical composition corresponding to the video content; and generating, by a processing device, an audio file comprising the third musical composition.

17. The non-transitory computer readable storage medium of claim 16, the operations further comprising:

identifying a third set of parameters associated with an updated version of the video content; and modifying the third musical composition based on the third set of parameters to generate a fourth musical composition.

18. The non-transitory computer readable storage medium of claim 16, the operations further comprising:

assigning a first subset of musical block types to a first marker section of a plurality of marker sections of the first musical composition;

identifying a first subset of musical blocks in view of the first subset of musical block types;

adding the first subset of musical blocks in view of a duration of the first marker section; and adjusting a tempo associated with the first marker section by setting a number of beats in the first subset of musical blocks in view of the duration of the first marker section.

19. The non-transitory computer readable storage medium of claim 18, the operations further comprising:

identifying a plurality of tracks corresponding to the first musical composition, wherein each of the plurality of tracks defines a section of a musical score associated with a virtual instrument type; and assigning a first virtual instrument to a first track of the plurality of tracks, wherein the first virtual instrument processes a portion of event data associated with a first virtual instrument type to generate a first audio output.

20. The non-transitory computer readable storage medium of claim 19, wherein the plurality of tracks comprises:

a transition end track comprising a first musical element extracted from a first musical block of the first musical composition, wherein the first musical element is played on a last instance of the first musical block in a sequence of repeated instances of the first musical block; and a transition start track comprising a second musical element extracted from a second musical block of the first musical composition, wherein the second musical element is played on a first instance of the second musical block in a sequence of repeated instances of the second musical block.

* * * * *